Dec. 22, 1931.  M. L. WILSON ET AL  1,837,743
DISPLAY APPARATUS
Filed Jan. 14, 1930
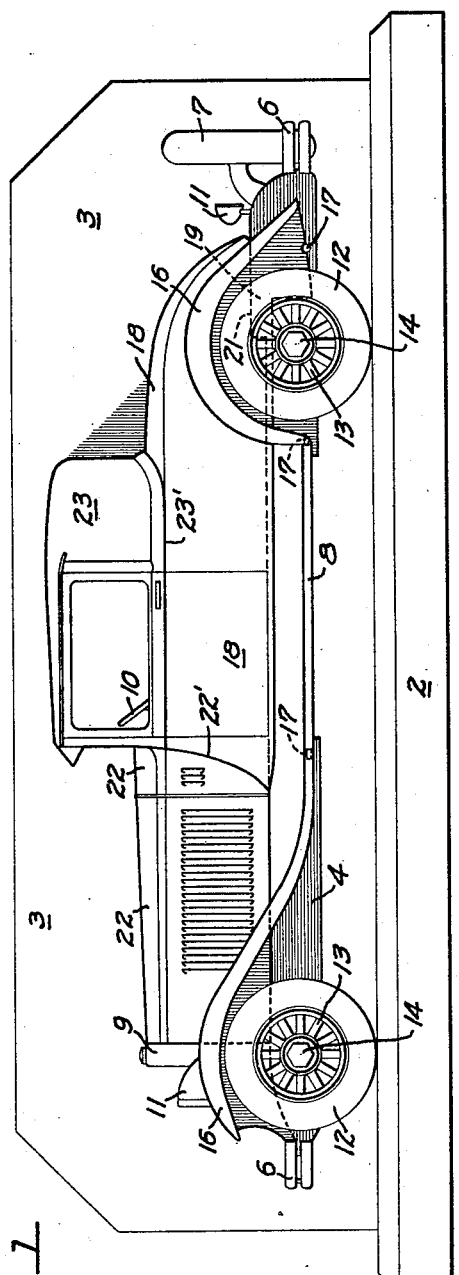
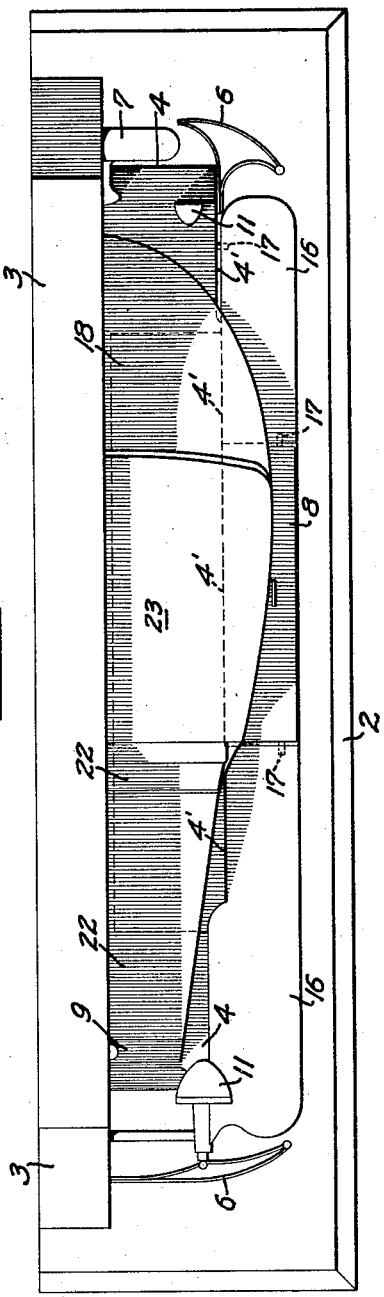
INVENTORS
MILDRED L. WILSON
EDWIN POND
BY Charles S. Evans
THEIR ATTORNEY Patented Dec. 22, 1931

1,837,743

UNITED STATES PATENT OFFICE

MILDRED L. WILSON AND EDWIN POND, OF SAN FRANCISCO, CALIFORNIA

DISPLAY APPARATUS

Application filed January 14, 1930. Serial No. 420,790.

Our invention relates to display apparatus and particularly to such apparatus for displaying automobiles in miniature.

One of the objects of the invention is the provision of a display apparatus which will permit the showing of various "paint jobs", or body shapes of an automobile, or other article in which color combinations or shapes of parts are selected by the purchaser.

A further object of the invention is the provision, in a display apparatus of the character described, of means for quickly and readily changing the color combination or body style of the article to permit selection to please the individual taste.

The invention possesses numerous other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawings:

Figure 1 is a side elevation of the apparatus of our invention; and Figure 2 is a plan view thereof.

For the purposes of illustration, our invention is shown and described as embodied in a device for displaying automobiles. It is to be noted however that other structures or articles, such as buildings, ships, furniture or other equipment may be displayed in accordance with the terms of our invention. In fact, any article which varies as to shape or color combination, or both, may be adequately displayed in this manner.

Individual tastes vary a great deal, and the problem of suiting these tastes presents many and grave difficulties in commercial practice. This is especially true in the case of automobile design and particularly in the higher price field with its special finishes and body shapes. A suitable means for adequately previewing the various styles and color combinations possible for a given job is highly desirable; not only by those interested in the production and selling of the vehicles, but by the purchaser as well.

When a person becomes interested in purchasing an automobile, he immediately wants to see what it looks like. However, few display rooms can accommodate more than a relatively small number of cars, and the problem of presenting to the interested party other possibilities, both standard and special jobs, becomes manifest. It is true that literature and drawings present themselves as a solution, but, since it is difficult to present all the possible variations as to shape and color by this means, they fail to adequately meet the need.

The purpose of this invention is to preclude the above mentioned difficulties, and to present a pleasing and accurate impression of the finished product. In one embodiment, it contemplates displaying, in three dimensions, a miniature of an automobile in which the shape and color of its various component parts may be quickly and readily altered.

In terms of broad inclusion the invention comprises a frame; portions of the frame being shaped to represent the chassis members of an automobile. Other units are provided to represent the body parts, so that they will fit together and to the frame to preferably form a miniature representation.

Also, means are provided for removably holding the body units on the chassis or frame while the model is being displayed. Preferably, a large number of body units are provided, representing various body shapes; and many of these units are in duplicate as to form, but are painted different colors. By changing first one unit and then another, a wide variety of body shapes, color combinations and trimmings can be assembled quickly and easily into display models, so that the customer can make his selection.

In greater detail the invention consists of a frame comprising the base 2, and a vertical back board 3 suitably secured on the rear portions of the base. These elements of the frame provide the pedestal and background for the miniature automobile. They may be made of any suitable material such as wood, or plastic compound; and may conveniently be finished in black to give an ideal setting for the model. Since an automobile is a symmetrical unit, the model preferably represents only that half of the complete machine necessary to give the picture, as shown in the drawings.

Mounted on the back board 3, and projecting outwardly therefrom in a spaced position above the base 2, is a shelf 4, shown in Figure 2 by the line 4'. This shelf comprises a part of the fixed frame and provides the mounting for the body parts of the model; the projecting edges being fashioned to represent the visible portions of the chassis. Preferably the bumpers 6, spare tire and mounting 7, running board 8, radiator 9, steering post 10 and lamps 11 are fixed to the chassis or frame; it being obvious however that these parts may also be made demountable.

The wheels 12 are also preferably formed as part of the chassis, and have a removable disk 13 held in place on the wheels by the detachable hub caps 14. These hub caps are mounted on plugs adapted to be inserted in suitable sockets provided in the center of the wheels, so that the wheel disks 13 may be removed. Thus it is seen that by providing numerous wheel disks, representing spoke, wire or disk wheels, and various finishes thereof, the character of the wheels may be changed at will.

The remaining body parts of the model are formed as a plurality of interfitting and demountably attached units. These units may comprise any portion or series of portions of the body, depending on the shape and painting of the body. In one style of body a particular division of units will prove most effective, and in another type still another will work to best advantage. In the preferred form of the invention, a certain division of units has been taken, but it is to be noted that others may be made.

The fenders and side apron form an integral part 16, and this unit is removably held in place on the chassis by suitable lugs 17. The tonneau part 18 is taken as another unit, and is removably seated on the shelf 4. A raised portion 19 of the shelf engages the recess 21 in the rear of the tonneau part and serves to hold the unit in place.

Still another unit comprises the hood and cowl parts 22, and is adapted to fit between the radiator and tonneau unit; the two units registering along the line 22'. The last demountable unit comprises the top portions 23 of the body, and is adapted to rest on the tonneau unit and interfit with the tonneau and cowl parts. Engagement of these parts is effected along the line 23'; and the assembly is complete.

Preferably a large number of these demountable units are prepared and painted different colors and with varying trimmings, so that by merely inserting a new unit a different color combination will obtain. The demountable units may be made into any shape, and the type or style of the body will simply depend on their specific arrangement. Any suitable material such as metal, wood or plastic compound, may be used to make the units.

The complete miniature may be assembled to exhibit any desired color combination or style of the body; and when the model is being displayed to an interested person or customer, that party sees the miniature, being built up before his very eyes. The selected model presents an accurate picture since it is an exact facsimile of the actual vehicle as it will finally appear. Moreover, the picture may be instantly changed as to either color or style of body to please the whim, mood or peculiarity of the individual.

Another possibility of the invention consists of making the body as flat units from sheets of stiff material; and these variously shaped units may conveniently be stamped out from sheets of fibrous material. By painting the variously shaped demountable units in different color combinations, a preselected appearance may be obtained by merely making a proper selection and arrangement of the units.

These flat units may be shaded to give the perspective impression of three dimensions; and since the units may be made easily and cheaply, it is possible to make the display full size. In this embodiment, the chassis shelf 4 needs to extend but a short distance from the back board 3, since the body units are comparatively thin. If the display is made full size, the chassis shelf may conveniently be mounted on the wall of a room; and suitable fasteners such as pins or pegs in the wall may be arranged to hold the body units in assembled position.

We claim:

1. A display apparatus consisting of a frame comprising a base, a vertical back board on the base, a shelf projecting from the back board, portions of the shelf being formed to represent the visible chassis elements of an automobile, pluralities of interfitting units mutually adapted to one another and to the frame to form a representation of the automobile, and means for demountably assembling variable sets of said units on the frame.

2. A display apparatus consisting of a frame comprising a base, a vertical back board on the base, a shelf projecting from the back board, portions of the shelf being formed to represent the visible chassis elements of an automobile, variously colored and shaped pluralities of interfitting units mutually adapted to one another and to the frame to form a representation of the automobile in accordance with a pre-selected appearance, and means for demountably assembling variable sets of said units on the frame.

In testimony whereof, we have hereunto set our hands.

MILDRED L. WILSON.
EDWIN POND.